March 30, 1943.  J. A. V. TURCK  2,315,464
CALCULATING MACHINE
Original Filed May 16, 1930   7 Sheets-Sheet 1

Fig.1.

INVENTOR.
Joseph A. V. Turck
BY Charles B. Rasmussen
ATTORNEY.

March 30, 1943.　　J. A. V. TURCK　　2,315,464
CALCULATING MACHINE
Original Filed May 16, 1930　　7 Sheets-Sheet 7

Fig. 11.

INVENTOR.
Joseph A. V. Turck
BY Charles B. Rasmussen
ATTORNEY.

Patented Mar. 30, 1943

2,315,464

UNITED STATES PATENT OFFICE 2,315,464

CALCULATING MACHINE

Joseph A. V. Turck, Wilmette, Ill., assignor to Felt & Tarrant Manufacturing Company, Chicago, Ill., a corporation of Illinois Original application May 16, 1930, Serial No. 452,876. Divided and this application July 9, 1938, Serial No. 218,449

9 Claims. (Cl. 235—130)

This invention relates in general to improvements in calculating machines, while it has more particular reference to improvements in calculating machines wherein additive actuating mechanisms are optionally arrangeable for key responsive operation and/or key set operation (an example of which is disclosed in United States Letters Patent No. 1,926,826 issued to Felt & Tarrant Manufacturing Company on September 12, 1933), it will be apparent that certain features of the application have other and more general valuable application. The instant application is a division of my co-pending application Serial No. 452,876, filed May 16, 1930, which has resulted in United States Letters Patent No. 2,241,102, issued May 6, 1941.

The principal object of the present invention is the provision of a motor driven calculating machine of improved construction wherein the banks of ordinally arranged digital keys may be optionally operated as a key responsive calculating machine for addition and subtraction and as a key set machine for multiplication and division and in association therewith to provide a shiftable carriage in with the numeral wheels and accumulator mechanism will be mounted and which may be progressively arranged in cooperative relation with the set-up multiplicand for ordinal reception of the adding movements in accordance with a multiplier.

Another important object of the invention is the provision, in a calculating machine having manually operable keys for controlling the operation thereof and a carriage shiftable relative thereto and containing accumulator mechanism, of means for preventing manipulation of any of the keys when the carriage is being shafted.

Another important object of the invention is the provision of an error control mechanism operative with both the key responsive and the key set mechanisms and acting to lock the automatic digital control devices in the event that error is made in setting up the multiplicand or divisor on the keyboard.

Another important object of the invention is the provision of a locking mechanism for preventing manipulation of the multiplier keys when the ordinal actuating mechanisms are arranged for key responsive action.

Another important object of the invention is the provision of locking mechanism and devices for preventing manipulation of any of the keys of the keyboard when the shiftable carriage is out of cooperative registration with the ordinal additive actuating mechanism.

Numerous other objects and advantages of the invention will be apparent as it is better understood from the following description, which, taken in connection with the accompanying drawings, discloses a preferred embodiment thereof.

Referring more particularly to the drawings the calculating machine shown therein constitutes the preferred embodiment of the invention and comprises a casing having a base plate 51, a top or keyboard plate 52, a front wall 53, a rear wall 54, a right hand side wall 55 and a left hand side wall 56. The bottom and vertical walls may, if so desired, be provided with sound deadening and cushioning packing 57. The operative parts are mounted in and carried by a framework which consists of right and left hand supporting plates 59 and intermediate partition plates 61, all extending from front to back of the machine and held in rigid relation by tie rods 62 upon which are mounted spacing bushings or sleeves 63. The machine shown in the drawings is of ordinal character and a plurality of accumulator actuating mechanisms for accumulating actuating units is provided, and the several actuating mechanisms of the adding orders of the machine are arranged between the partition plates 61 as shown in Patent No. 1,926,826 hereinbefore referred to. Each adding order of the machine is provided with a series of digital control keys 64, each such series comprising nine keys bearing numbers 1 to 9 to be used in addition and multiplication and their complements to be used in subtraction and division.

A plurality of accumulator units, generally indicated by reference numeral 65, are mounted in a shiftable carriage generally indicated by reference numeral 66, which, as will presently be more fully explained is shiftable transversely of the actuating units and into progressive cooperative relation therewith to cause predetermined additive actuations to be received by and stored in predetermined desired accumulator units. The carriage comprises generally a frame consisting of partition plates 67 secured in spaced relation by tie rods 68 and bushings 69. The carriage is pivoted upon a cross-rod 71 mounted upon extensions 72 of the side supporting plates 59 and rests upon a trackway 73 which in turn is supported upon and fixed to said supporting plates. The carriage 66 is provided with a carriage housing 74 enclosing its rear, top, front and ends, leaving the bottom open for cooperating engagement between the accumulator units 65 and the additive actuating mechanisms.

Figure 1:
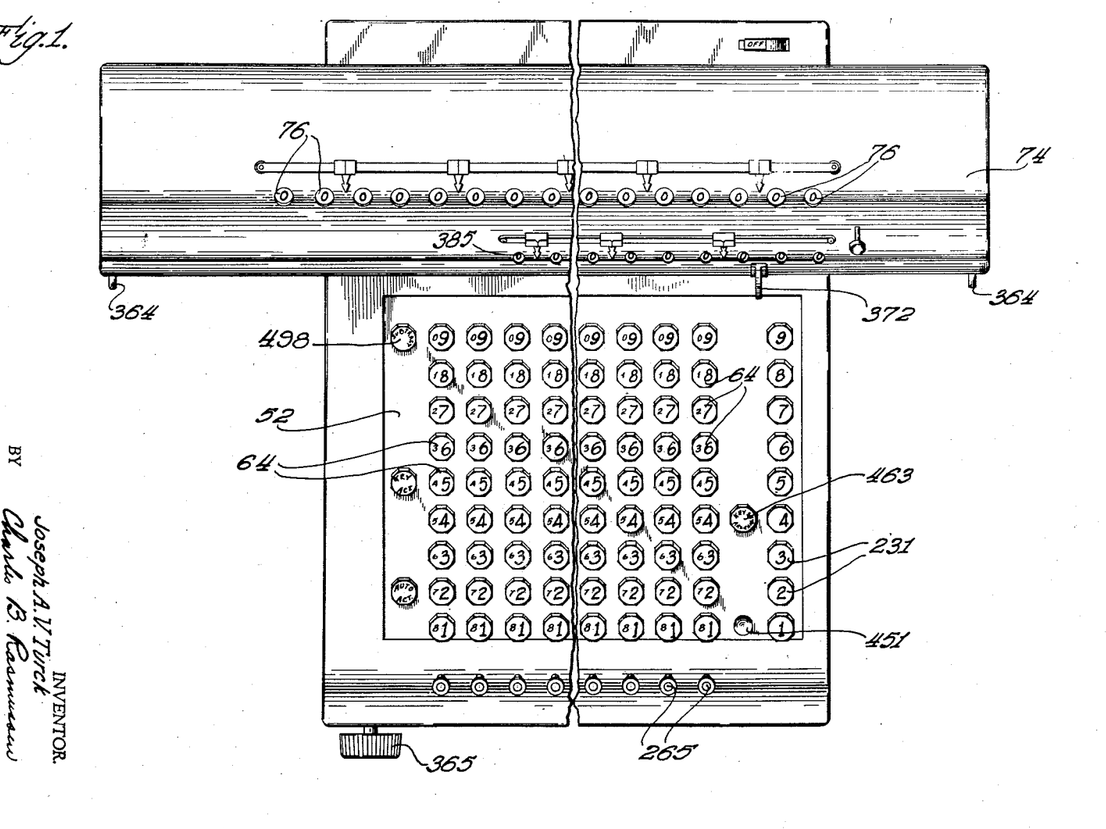
Figure 1 is a plan view of a calculating machine embodying my present invention.
Figure 4:
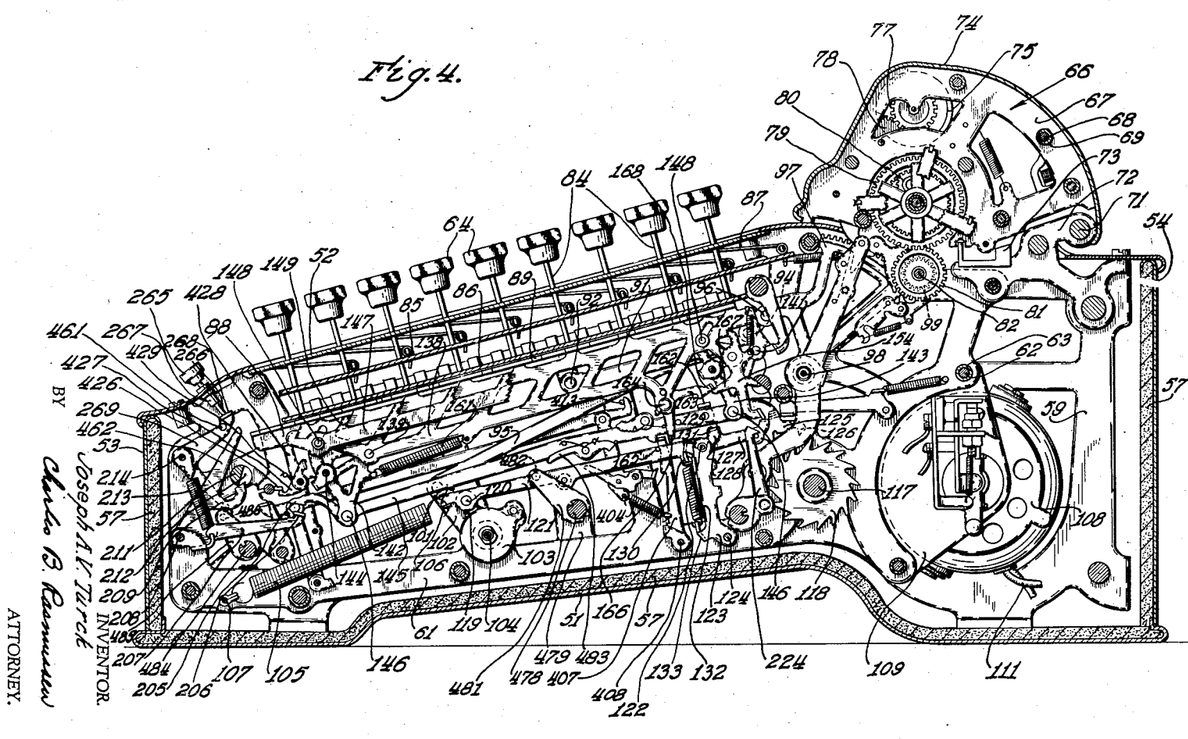
Fig. 4 is a front to back vertical section taken at the right of the right hand digital order of the machine.

Each accumulator unit 65 comprises a numeral wheel 75 adapted to be viewed through sight openings 76, Fig. 1, in the casing housing 74 and carrying a pinion 77, Fig. 4, in mesh with a pinion 78 which in turn cooperates through a cyclic gear 80 with a gear 79 which forms a transmitting gear mechanism for advancing the numeral wheels 75 by the desired adding movements and in accordance with the degree of actuation of the ordinal column actuators as received by a ratchet gear mechanism 81 fixed upon a cross-rod or shaft 82 carried in the main frame of the machine.

In the movement of the carriage 66 and its contained accumulator units 65 across the machine, the gears 79 are disengaged from the ratchet gear mechanism 81 at the beginning of a shifting movement and re-entrained in cooperative relation with other ratchet gear mechanisms as may be desired in the calculation.

Each key 64 is provided with a downwardly extending stem 84 arranged through the keyboard plate 52 and through sub-plates 85 and 86. Springs 87 are provided to hold the keys 64 in elevated position after each key stroke. Each order of the machine includes a digital stop bar 88, Fig. 4, arranged to extend beneath the lower end of the key stems 84 when the keys are in elevated position and to be pulled rearwardly of the machine in amount determined by the additive value of the particular key of the order depressed. The stop bar 88 is provided with differentially spaced lugs 89 adapted to engage the depressed key stem 84 of the order, the spacing being such that the stop bar 88 has an increasing unit movement from the 1-key at the front to the 9-key at the rear of the associated order of the keys.

A link 91 is connected at 92 with a downwardly extending arm or lug on the stop bar 88 and at 94 to a link 95 in turn connected at 96 to a rack sector 97 pivoted upon a cross-rod 98 and provided with teeth continuously in engagement with a pinion 99 forming a part of the ratchet gear mechanism 81. The link 95 is pivotally connected at its other or front end 101 with an arm 102 of a friction device 103 carried upon a shaft or rod 104 extending across the machine and having bearing in the partition plates 61. A spring 105 is connected at 106 with a link 121, to be later described, and at 107 to the frame of the machine. Upon an adding movement, depression of the sector 97 is accomplished by a continuously moving power mechanism to which it is connected by depression of a key, the result of this connection to the power being that the associated rack sector 97 is swung down the desired amount with a consequent extension of the spring 105 and the storing in it of power to accomplish the adding movement upon disconnection of the actuating unit affected from the power means.

Figure 3:
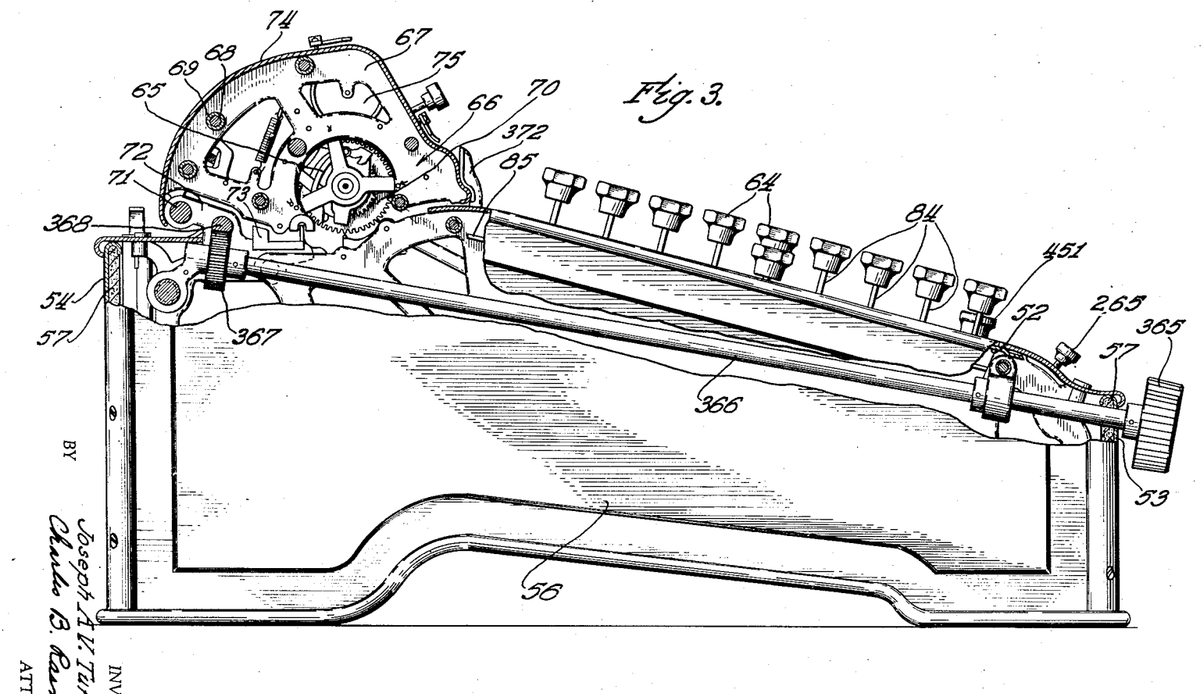
Fig. 3 is a side elevation taken from the left, parts being broken away and shown in section.

This power means comprises an electric motor 108 (Fig. 3). The motor 108 is secured to and carried by supporting plates 109 fixed in the frame at the rear of the machine, current being supplied to the motor through suitable electric wiring and controls indicated generally by reference numeral 111. It is not believed that a detailed description of the motor 108 and the wiring for its supply of current is necessary to an understanding of the instant invention. The motor rotates continuously when the machine is in use.

The motor 108 actuates a gear train mechanism (not shown) which meshes with a gear fastened upon a shaft 117 extending across the several columns or orders of the adding machine. The shaft 117 is provided with a toothed wheel 118 for each order of the adding machine, these toothed wheels being arranged adjacent the several actuating units or mechanisms.

Referring to Fig. 4, it will be noted that the friction device 103 of each actuating mechanism is provided with an arm 119 pivotally connected at 120 with a link 121 in turn pivoted at 122 in an upright guard arm 123 pivotally mounted upon a cross-pin or rod 124 extending across the frame. An arm 125 having a tooth or hook 126 at its free end and a spring lifted lever 127 are also pivoted to the upper end of the guard arm 123 on pivot 122. The spring lever 127 is arranged within or beneath a bent-over portion 128 of the hook arm 125 and has a lip 129 extending over toward the hook arm 125 at the rear end of the spring lever 127. A spring 131 is wound about the pivot 122 and normally holds the hook arm 125 in engagement with the spring arm 127. A spring 132 is secured at 133 to the lower portion of the guard arm 123 and to the front end of the spring lever 127 at 130 and tends to lift the free end of the spring lever 127 upwardly to sustain the hook 126 of the arm 125 normally out of contact with the toothed wheel 118.

In accomplishing a calculating operation, depression of a key causes the hook arm 125 to engage the toothed wheel 118 and to be moved a full stroke of the machine. The hook arm 125 is provided with two downwardly extending lugs or projections (Fig. 4) adapted to be engaged by the teeth of the wheel 118 forwardly of the tooth engaged by the hook 126 as the hook is drawn rearwardly to lift or cam the hook upwardly and positively disconnect the hook from the engaged tooth at the end of a predetermined adding movement, where upon the spring 132 returns the hook arm 125 to its normal position. The power strokes thus induced are all of a predetermined travel which is the same for all digital values. The sector or rack segment 97 is moved downwardly in this power stroke, only the amount permitted by the particular digital key depressed, downward movement of the sector continuing until halted by engagement of the stop bar 88 with the key stem of the key depressed. The friction device permits continuation of the movement of the link 121 after the halting of its associated sector 97. The power stroke extends the spring 105 and stores up in it the power needed to accomplish the adding actuation of the accumulator. Upon disconnection of the hook 126 from the toothed wheel 118, the spring 105 moves the parts back to normal position, the latter part of this movement being accompanied by an upward movement of the rack sector 97, and, through the toothed wheel mechanism 81 by the desired advancement of the numeral wheel 75 of the associated accumulator unit 65. The earlier part of the return movement under the impulse of the spring 105 is taken up in the friction device 103.

The control of the hook 125 prevents its engagement with the toothed wheel 118 until a particular key depressed is locked down into depressed position where it must remain until released. A parallel motion device is provided for each actuating unit and includes an equalizing key bar 138 pivoted at 139 and 141 respectively to levers 142 and 143, which in turn are pivoted at 144 on rods extending through the partition plates of the frame. The parallel motion device also includes a bottom bar or link 145 pivoted at 146 to the lower ends of the levers 142 and 143. A key locking bar 147 (Fig. 4) is pivoted at each end at 148 to the upper ends of the levers 142 and 143 and is provided with locking fingers 149 adapted to enter into conically faced openings formed in the key stems 84 as they are depressed. Depression of the key bar 138 by a key stem in its parallel motion swings the levers 142 and 143 in a clockwise direction and causes the adjacently arranged locking finger 149 to enter into the presented opening in the stem 84 of the key depressed.

The machine shown in the drawings contemplates the locking down of a depressed key and also of the key bar 138 until the rearward movement of the link 121 is nearly completed. A bent lug 162 is provided upon the lower bar 145 of the parallel motion device and a hook latch 163 is pivoted at 164 on the key bar 138 in position to hook over the bent lug 162 before the key bar 138 reaches its lowermost position under the key stroke. In order that this locking down of the key bar 138 and of the key 64 may be accurately released after predetermined travel of the parts, a pin 165 is provided upon the link 121 in position to engage a downwardly extending finger 166 formed integrally with the hook latch 163, striking of the pin 165 against this finger 166 unhooking the latch and permitting the parts to rise again to normal position.

Mechanism is provided to prevent re-engagement of the latch 163 with the lug 162 if the key be held for more time than is required for the calculating operation. A dog 154 is provided with a forwardly extending finger 167 normally arranged beneath a lug 168 on the end of the hook latch 163. After the hook 126 becomes disengaged from the power toothed wheel 118, the spring 105 moves the link 121, the spring arm 127 and the hook arm 125 back towards the front of the machine. In this movement, if a key be held depressed, the lug 129 on the finger 127, already mentioned, strikes against a lug of the dog 154 swinging the dog toward the front of the machine and causing the finger 167 to raise the hook latch 163 out of engagement with the lug 162 and the finger 167 acts to hold the hook latch out of operative position until the key is released. Continued depression of the key prevents re-engagement of the lug of the dog 154 upon the top of the lug 129. Upon release, the parts are then moved back into position by a spring 161 which is connected to the key bar 138 and the lever bar 142.

As has been earlier stated, the machine shown in the drawings and disclosing the preferred embodiment of the invention is adapted for operation either as a power-driven key responsive calculating machine or as a power-driven key set machine for automatic actuation.

Means are provided for holding the keys and the parallel motion mechanism in the positions they assume upon key depression. Referring to the left hand end of Fig. 4, it will be noted that the forward ends of the links 145 are formed into lugs 205 arranged adjacent companion lugs 206 on latch arms 207 pivoted upon a cross-rod 208 in the frame. Each latch 207 is provided with an arm 209 having its end arranged adjacent a shaft 211 also extending across the machine and through suitable bearings. This shaft is milled to its center at 212 adjacent each latch arm 209 and when swung in a clockwise direction (viewing Fig. 4), a spring 213 fastened to the latch arm 207 and to a rod 214 extending across the frame will pull the latch arm up into position to be engaged with the latch extension or lug 205 of the link 145 when a key is depressed to move the parallel motion device of its order. When a latch arm 207 is rendered operative, the lug 206 of the latch arm raises into contact with the latch extension 205 of its companion parallel motion device and upon rearward movement of the link 145 becomes locked in hooked engagement with the latch arm 207.

It will be noted that the forward movement of the dogs 154 out of operative position with the spring levers 127 results in no depression of these levers when a key is pushed down and the mechanism locked in key set position. The spring lever 127 and the hook arm 125 of the order involved are held up by the companion spring 132 until actuated by supplemental mechanism, which will be presently described, this mechanism being adapted to produce repeated actuations to accomplish multiplication and without the release or resetting of the particular key of the actuating mechanism depressed.

Figures 9, 10:
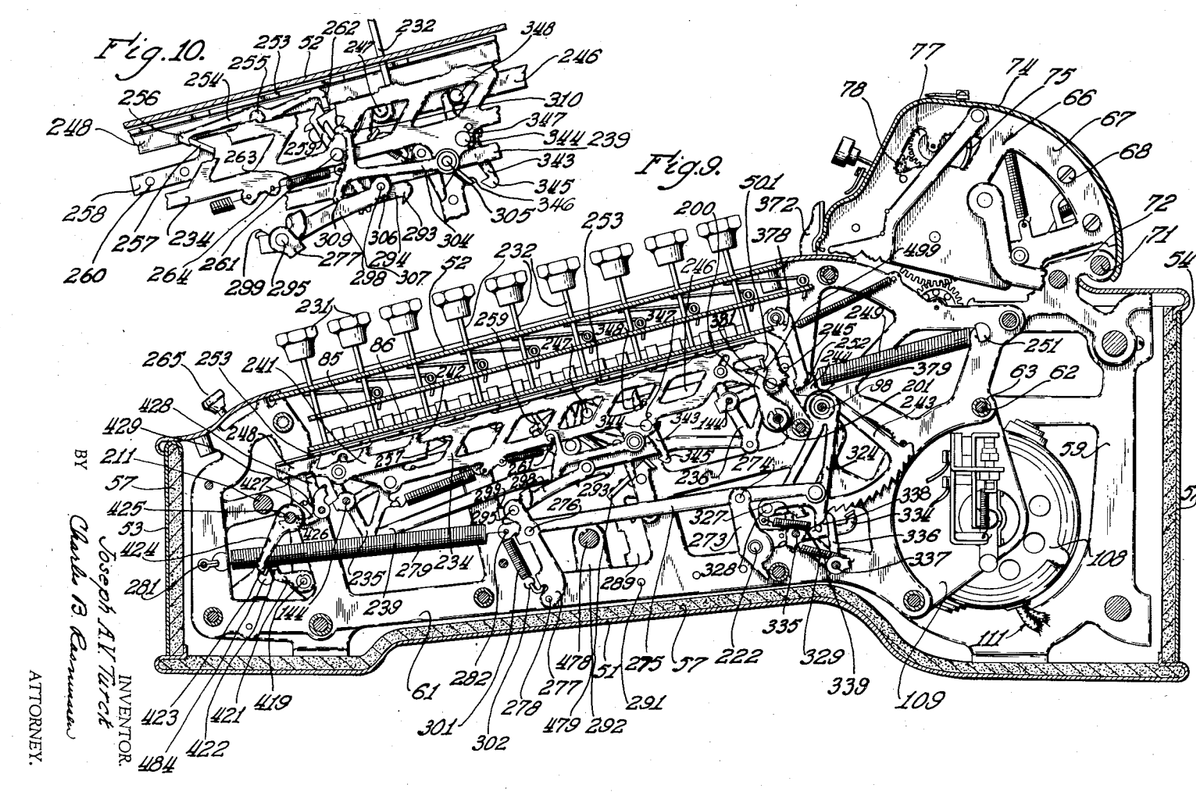
Fig. 9 is a front to back vertical sectional view taken through the machine and alongside the multiple control mechanism.
Fig. 10 is an enlarged fragmentary detail of the multiple control mechanism, shown in Fig. 9.

Referring now to Figs. 1, 9 and 10, it will be noted that a column or bank of keys 231 is arranged at the right hand side of the key-board and one space removed from the ordinal columns of keys 64. These keys 231 are constructed and arranged like the keys 64 and like them also are provided with stems 232 adapted to actuate a parallel motion device comprised of an equalizing bar 234, two levers 235 and 236, pivoted respectively upon the cross-rods 144, and a lower bar 239 pivoted at its ends to the levers 235 and 236. A key locking bar 241 is pivoted in the levers 235 and 236 and has locking fingers 242 adapted to enter into openings in the keys exactly as do locking fingers 149 of the lock bars 147 in the key stems 84. The keys 231 are multiplier keys and depression of any one of them results in the connection of the hook arm 125 (Fig. 4) with the toothed power wheel 118 for the number of repeated additive operations indicated by the key depressed, i. e., one addition of the set-up multiplicand if the front key, namely the 1-key, be depressed; two additions if the second key from the front be depressed, etc.

A ratchet segment 243 is pivotally mounted to rotate about the cross-rod or shaft 98 upon which are mounted the rack sectors 97. This ratchet segment 243 is disposed in position to control the number of reciprocations imparted to a latch 224 in number corresponding to the digital value of the particular key 231 depressed by the operator. In the instant embodiment of the invention the rack sectors 97 extend up to and to the rear from the pivotal supporting rod 98, and the ratchet segment 243 extends downwardly from the rod 98, and into co-operative relation with certain parts and devices to be presently described.

An arm 244 extends up above the ratchet segment 243 and is pivotally connected at 245 with a link 246 in turn connected at 247 with a differentially movable slide bar 248 constructed, mounted and controlled like the bars 88 of the additive actuating units. Depression of a key 231 results in a movement of the ratchet segment 243 in an idle clockwise stroke (viewing Fig. 9) in amount determined by the value of the particular key depressed.

A spring 249 is connected at one end at 251 to the right hand partition plate of the frame and at 252 to the upwardly extending arm 244 forming a part of the ratchet segment member 243. This spring at all times tends to move the ratchet segment in a clockwise direction (viewing Fig. 9) and upon depression of the key the ratchet segment moves down and toward the front of the machine until halted by engagement of the adjacent differentially arranged projections 253 upon the slide bar 248 with the stem 232 of the key 231 depressed.

The spring 249 is under tension, and is restrained in its pulling movement upon the ratchet segment 243 and the bar 248 by a latch 254 pivoted at 255 on the bar 248 and having a hooked forward end 256 normally engaging over a stop lug 257 upon a cleat or member 258 fixed to the adjacent partition plate of the frame at 260. The construction and arrangement of the parts is such that upon depression of a key 231 the latch 254 will be disengaged from its holding lug 257 and the differential stop bar 248 may then be pulled rearwardly of the machine by the spring 249 and the ratchet segment 243 moved as already described and until the appropriate differential projection 253 of the bar 248 engages the lowered key stem 232.

A latch dog 259 is pivoted at 261 on the equalizer key bar 234 and has its latched end normally arranged above a tail or lug 262 on the rear end of the latch 254. When the equalizer key bar 234 is moved downwardly by the depression of a key, the dog 259 rocks the latch 254, as will be readily understood, and releases the differential bar 248. A spring 263, fixed to the dog 259 below its pivot, and at 264 to the key bar 234, presses the dog 259 into active engagement with the latch 254 to maintain the parts normally in the locked relation.

When the ratchet segment 243 is set by the depression of one of the keys 231 for a predetermined automatically controlled repetition of additive movements, means are provided to hold the equalizer key bar 234 and the depressed key in set position until the instigated calculation is completed.

Upon depression of any one of the keys 231 a reciprocatory movement is automatically imparted to the shaft 222. At the right hand side and beneath the bank of keys 231 an arm 273 is fixed upon the shaft 222 and has pivotal connection at 274 with a link 275 pivotally connected at 276 in a guard arm 277 extending up from a lower pivotal mounting 278 in the frame of the machine. A spring 279, fixed in the frame at the front of the machine at 281, is connected to the forward end of the link 275 at 282 and tends to pull the arm 273, which is fixed on the shaft 222, toward the front of the machine. Periodic controlled reciprocation rearwardly of the machine is imparted to the arm 273 and shaft 222 under the control of the keys 231.

Figure 11:
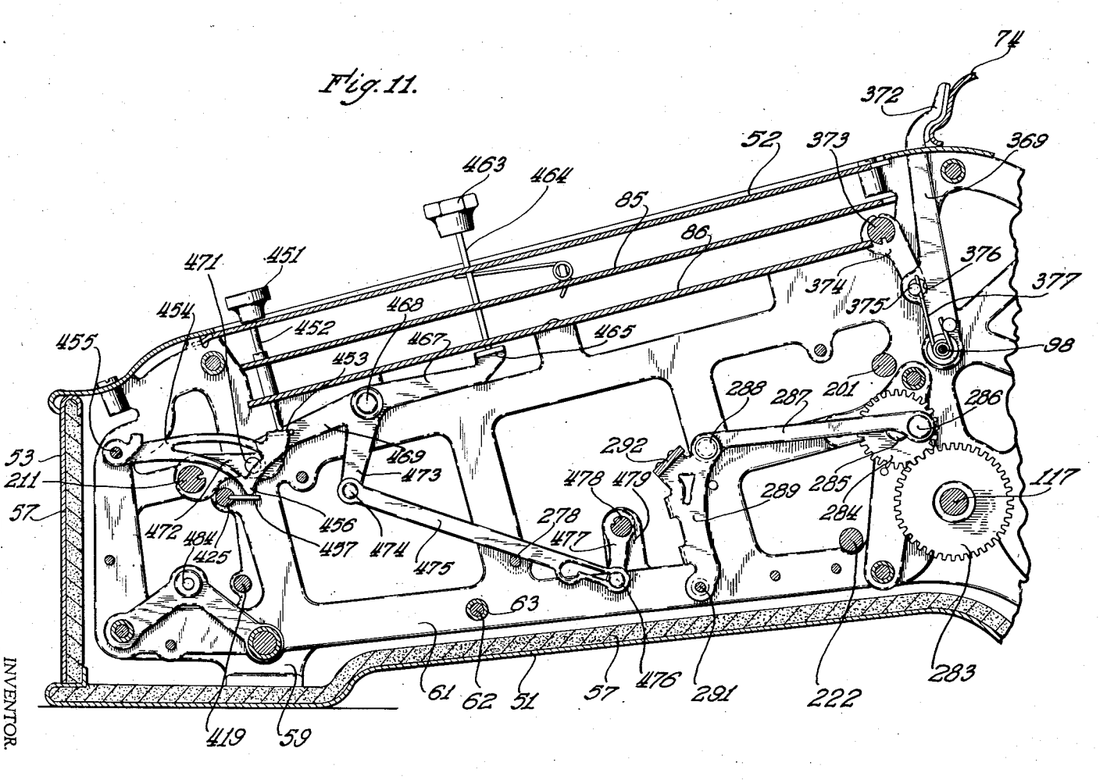
Fig. 11 is a vertical front to back sectional view illustrating means by which power is transmitted from the motor drive to the multiple control mechanism and likewise the universal keyboard clearing device provided for use in key set operation.
Figure 12:
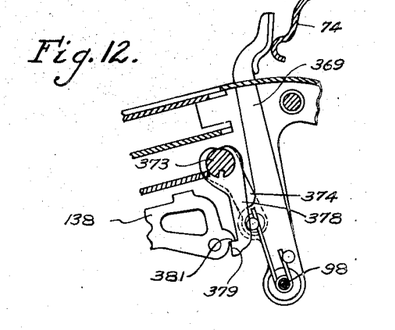
Fig. 12 is a fragmentary sectional view showing in elevation the details of the novel key locking mechanism in the locked position.

Referring now to Fig. 11, it will be noted that a gear 283 is fixed upon the power shaft 117 and in the column space beneath the keyboards of the keys 64 and 231. The gear 283 rotates continuously and is in mesh with a pinion 284 which is pivoted upon a stud shaft 285 and carries a crank or eccentric pin 286. A link or connecting rod 287 engages the crank pin 286 and a pin 288 provided at the upper end of an oscillating arm 289, which is pivoted upon a rod 291 arranged for bearing support in or near the bottom of the frame of the machine.

The lever 289 is provided at its top with a cross plate 292, which extends over into the space occupied by the mechanism controlled from the keys 231 and in its continued oscillatory reciprocation is arranged to actuate such mechanisms to impart the plural or multiple actuation of the additive actuating mechanism.

The plate 292 is adapted to be engaged, as calculating operations of the machine may require, by the hook end 293 of a hook member 294 pivoted at 295 in the upper end of a guide arm 277 which in turn is pivoted at 278 at or near the base of the frame of the machine. A spring lever 298, similar to the spring lever 127, is provided to control the action of the hook member 294 and is pivotally supported at 295. A spring 299 acts to hold the spring lever 298 and the hook member 294 in closely adjacent coincident relation. A spring 301 is arranged between the base of the guide arm 277 at 302 and the rear end of the spring lever 298 to lift the lever 298 as occasion may permit.

The engagement of the hook 293 with the plate 292, as the plate 292 reciprocates, is accomplished as the result of the depression of the key 231. A forwardly extending horizontal arm 304 (Fig. 10) is pivoted at 305 in a downward projection of the equalizer bar key 234 and this arm is arranged for engagement with a roller 306 mounted at 307 on the spring lever 298. The arm 304 at its forward end is provided with a bent lip or lug 309 arranged beneath the lower bar 239 of the parallel motion device controlled by the keys 231. The lug 309 limits upward movement of the arm 304 and the arm is provided with an upwardly arranged hook 310 adapted to engage over the pivot 261 of the latch dog 259. Upon depression of a key 231, the latch dog 259 releases the hook lever 254 with its lower end resting upon the lug. The depression of a key 231 therefore moves the spring lever 298 down since the roller 306 is pressed down by the arm 304. The hook 293, however, is held up by the interengagement of lugs so as to allow the necessary time for the ratchet segment 243 to be swung to its position as determined by the particular digital key 231 which has been depressed.

An arm 324 (Fig. 9) is mounted upon the rod 98 adjacent the ratchet segment 243 and carries a pawl 327 pivoted at 328 in the lower end of the arm and is arranged in position to engage the teeth of the ratchet segment progressively to move it back toward normal position, one tooth for each oscillation of the shaft 222. A spring 329 is fixed at one end to the pawl 327 and at the other to the arm 324 which normally pulls the pawl into ratchet teeth engaging position. When the parts are arranged in normal position, the pawl 327 is held out of engagement with the ratchet teeth by means of a fixed cam (not shown, but lying behind the pawl 327 in Fig. 9) which is fastened upon an adjacent frame member, under which the lip of the pawl rides to move it downwardly to an inoperative position. At each stroke or oscillation of the shaft 222, the pawl 327 rides off this cam and into engagement with the presented tooth of the ratchet segment 243 advancing it one tooth part per oscillation.

A back stop pawl 334 (Fig. 9) pivoted at 335 on an adjacent frame plate is provided to engage and hold the ratchet segment 243 as it is progressively advanced by reciprocation of the pawl 327. A locking detent is provided for locking the back stop pawl 334 out of operative position at the end of a calculation, so that the ratchet segment 243 may freely swing the amount determined by the particular digital key depressed, and comprises a latch 336 pivoted at 337 on the frame and arranged in position to engage a locking lug 338 formed on the back stop pawl 334.

In order that the equalizing key bar 234 may be held down and the depressed key 231 locked against return movement until the end of the desired number of additive calculations, a lever 343 (Figs. 9 and 10) is provided which is pivoted at 344 on the equalizer bar 234 and has a hook 345 at its lower end adapted to engage beneath a lock plate 346 fixed on the frame of the machine. A spring 347 normally swings the lever 343 in a clockwise direction. The upper end of the lever 343 is adapted to engage a stud 348 mounted upon the link 246 which connects the differential key stop bar 248 with the ratchet segment 243. When the parts are in non-calculating position, the stud 348 maintains the lever in the position shown in Fig. 9, pressing it in a counter-clockwise direction against the force of the spring 347. Upon depression of a key 231 and a differential rearward movement of the stop bar 248, the stud 348 moves rearwardly and releases the lever 343, permitting it to become latched as the equalizing bar 234 reaches the bottom of its movement. Once latched with the lock plate, the lever 343 holds the parts in operating and repeating position until the return movement of the ratchet segment 243 causes the stud 348 to again engage the lever 343 and release the parallel motion device for return movement.

The carriage in which the accumulator mechanisms or units are mounted is shiftable across the units of additive actuating mechanism through a lifting and sliding motion to detrain the gears 79 from the ratchet gear mechanism 81 in the initial movement of the carriage. The carriage is held up as it is shifted and until it is lowered to re-entrain its accumulator gears 79 with the then presented ratchet gear mechanisms 82. The carriage may be lifted directly by pulling up on finger pieces 364 arranged at each end of the carriage, or by the turning of a knob 365 arranged at the front of the adding machine and upon a shaft 366 extending to the back which has a gear 367 fastened to it which is in mesh with a toothed bar or rack 368 in the carriage.

It is desirable that, when the carriage is lifted, either directly or through manipulation of the knob 365, all of the keys 64 and 231 be locked against depression until re-entrainment of the gears establishes co-operation between the accumulator units 65 and the additive actuating mechanisms.

Referring to Fig. 11, which is a section taken through the machine between the column of multiplier keys 231 and the bank of keys 64, it will be noted that a lever 369, pivoted upon the cross-rod 98 has its upper end 372 formed for engagement with the forward or free edge of the carriage and that upon lifting of the carriage the end 372 will be swung toward the front of the machine. A shaft 373, extending across the machine is provided with an arm 374 having a pin 375 at its outer end which is engageable with a relatively large opening 376 formed in the lever 369. A spring 377 normally holds the pin 375 toward the front edge of the opening 376.

Lifting of the carriage swings the lever 369 towards the front of the machine and similarly swings the arm 374 and rocks the shaft 373. The shaft 373 carries a dog or latch 378 (Fig. 9) for each column of keys and the lower end of each of these dogs is provided with a locking lip 379 adapted for engagement beneath a lug or projection 381 provided upon the rear end of the associated equalizing key bar 138 or 234 so that when the shaft 373 is rocked, all the orders, both of the additive actuating mechanism and of the multiplier keys, are locked against operation. Each lip or lug 379 is angularly disposed as is also its co-operating shoulder 381 on the companion equalizer 138 or 234. The purpose of this construction is to permit the locking up of orders of the machine even though other orders may be in depressed condition, the lip 379 of each order depressed moving in above the companion lug or projection 381.

Figure 5:
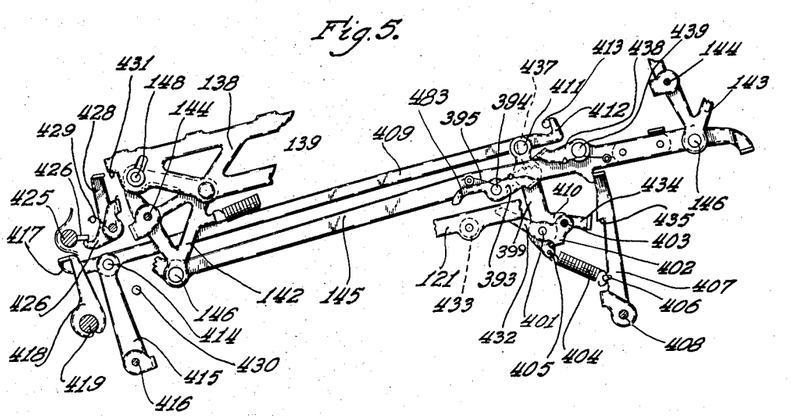
Fig. 5 is an elevation of a portion of the error control mechanism.

A latch 393 (Fig. 5) is pivoted at 394 on each bar 145 of the parallel motion device of the adding actuating mechanism. A spring 395 normally presses a lip 396 of the latch 393 into contact with the under surface of the bar 145. A ratchet tooth 397 is provided upon a ratchet member 398 which is arranged upon the upper end of a lever 399. The lever 399 is pivoted at 401 in a yoke 402 which in turn is pivoted on a cross-rod 403 extending across the several orders of additive actuating mechanisms. A spring 404 is attached at 405 to the lever 399 and to a lip 406 formed on a lever 407 which is pivoted upon a cross-rod 408. Upon depression of one of the keys 64 the bar 145 is moved toward the front of the machine, i. e. toward the left (Fig. 5), and the latch 393 carried by the bar 145 moves with it and past the ratchet tooth 397.

If a key be released without fully effective depression, the forward movement of the link or bar 145 will be incomplete and the spring 161 of the parallel motion device (of which it forms a part) tends to return the parts to their original position without accomplishing the calculating operation. In order to advise the operator that an incomplete key stroke has been made and to insure redepression of the particular key in the necessary amount, locking mechanisms are provided, which will now be described. As a result of an incomplete movement and through mechanisms to be now described, all of the columns of keys, except that in which the insufficient key stroke has occurred, are locked against operation as a warning or notice to the operator of an insufficient or incomplete key stroke.

A link 409 is pivoted at 411 to the upper end of the lever 399 and is provided at its rear end with a hook 412 normally engaging a stud 413 fixed in the frame and limiting forward movement of the lever 399 under the influence of the spring 404. The link 409 is pivoted at 414 to the upper end of an arm 415. The arm 415 is pivoted at its lower end to the cross-rod 416. The link 409 is provided with a laterally bent or extending lug 417 arranged in the path of an upwardly extending arm 418 which is fastened to a shaft 419 extending past the several orders of the machine. The shaft 419 is provided with an arm 421 (Fig. 9) extending forwardly of the machine and carrying a lip 422 at its free end. The lip 422 is normally arranged behind and holds forwardly the lower end 423 of a companion arm 424 fixed upon a cross-shaft 425. Rocking of the shaft 419, upon insufficient key stroke in any column, lifts the arm 421 and frees the arm 424 so that it may be brought to locking position. The shaft 425 is provided with a leaf 426 adjacent each column of the machine. The leaf 426 extends out over the tail 427 of a locking dog 428 which is mounted upon a cross-rod in the frame of the machine. Springs 429 normally urge the dogs 428 rearwardly into position so as to engage shoulders 431 formed in the forward ends of the equalizer bars 138 and 234. The springs 429 normally urge the arm 424 in a counter-clockwise direction when the arm 421 is lifted for the incomplete key stroke of a particular column and also urges the dog 428 into locking position in all of the columns except the column in which the insufficient key stroke has occurred.

The dog 428 of the column is prevented from engaging its companion shoulder 431 of the equalizer key bar because the locking of the latch 393 prevents the complete return to normal position of the parallel motion device. This is accomplished through the engagement of the arm 415 with a stop 430 which is arranged in the path of return reciprocation of the arm 415. It is to be noted that since the latch 393 is engaged at this time, the ratchet tooth 397, the link 409 and the arm 415 will move back with the bar 145. Correction of the error is accomplished by the complete and proper depression of a key which permits the parts to return to normal position, whereupon the dog 428 of the column affected will move to locked position and complete locking of the keyboard is accomplished.

Figure 6:
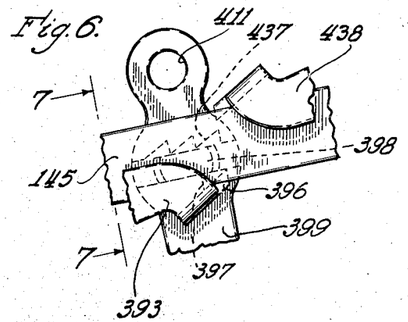
Fig. 6 is an enlarged fragmentary detail of a portion of the error control mechanism.
Figure 7:
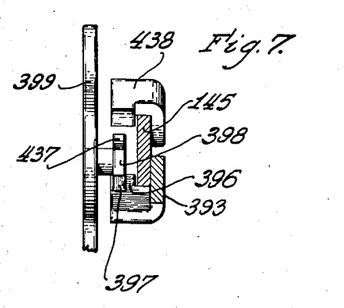
Fig. 7 is a section taken substantially on the line 7—7 of Fig. 6.
Figure 8:
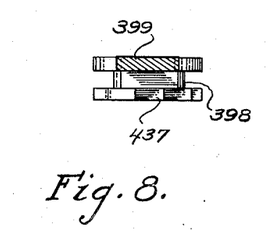
Fig. 8 is a section taken across certain parts of the error control mechanism.

Means are provided for moving the ratchet tooth 397 (Fig. 6) out of the path of the latch 393 only when full key stroke is accomplished. The yoke 402 (Fig. 5) has an arm 432 which is pivoted at 403 and extends across the path of a roller 433 attached to the link 121. As the parts near the end of the power stroke, the roller 433 engages the arm 432 and lifts the yoke 402 about its pivot 403 causing the lever 399 to raise the ratchet tooth 397 above the lower edge of the bar 145 and out of the way of the latch 393. The yoke 402 has a rearwardly extending arm 434 having a bent lip at its end which is adapted to engage a shoulder 435 when the lever 399 is lifted by the roller 433. The lever 399 is held in this upper latched position until near the end of the return stroke at which time a lug 436 on the bar 145 engages the upper end of the lever 407 and disconnects it from the arm 434, and resetting the parts for the next calculating operation. A rearwardly extending lug 418 is provided on the lever 399 for engagement with the rod 403 to limit the downward movement under the pull of the spring 404 when the parts are moving from one position to another.

To prevent miscalculation from redepression of a key before the adding operation of the previous stroke is completed, a number of ratchet teeth 437 are arranged on the ratchet member 398 and are adapted to be engaged and locked by a latch member 438 which is pivoted at 439 on the bar 145 when the bar and the depressed key return to normal position. It is also pointed out that the key must be fully depressed to prevent locking of the keyboard. After the key has been fully depressed, the lever 399 is lifted and any effort exerted through the key to depress the parallel motion device before the adding movement is completed will cause the latch 438 to engage any one of the teeth 437 since during the return or adding motion of the bar 145, the lever 399 is held in raised position by means of the lever 407. The latch 438 will therefore engage the teeth 437 if the depression of a key tends or attempts to move the bar 145 in the reverse direction, i. e. upon a new adding actuation.

Referring now to Fig. 11, the reference numeral 451 indicates a key adapted to release the column locks set into action by the insufficient depression of a key. The key 451 has a stem 452 which is arranged above a turned-over end 453 of a lever 454 mounted in the column space between the multiplier keys 231 and the additive actuating keys 64. The lever 454 is pivoted upon a shaft 455 extending across the machine. The lever 454 has a downward projection 456 arranged above a leaf 457 which is fastened to the shaft 425. The position of the parts shown in Fig. 11 is that assumed normally and when the keyboard is not locked as a result of an insufficient key stroke. It will be remembered that the shaft 425 is rotated in a counter-clockwise direction (Figs. 4, 5 and 11) by the springs 429 of the latch dogs 428 after an insufficient key stroke. This movement raises the key 451 (Fig. 11) in position to be depressed by the operator after the correction of the error has been made and at the same time releases the key locks. Downward movement of the key 451 swings the leaf 457 downwardly and rotates the shaft 425 back to its normal position. This movement rotates the arm 424 toward the front of the machine and brings it into re-engagement with the arm 421. The latches 428 at the same time will be forced downwardly and held in released position by the arm 421.

After a number has been set up on the keyboard of the additive actuating column of keys and when the machine is arranged for key-set automatic operation, depression of one of the keys 231 accomplishes a repeated adding operation, a multiplication or a division, depending upon whether positive or negative calculation is being undertaken. This results in the accumulation of the accumulator units co-operatively connected by the position of the carriage with the orders of keys in which keys have been depressed and set. Assuming that the first calculation is of the multiplicand to the amount of the digital value of the unit of the multiplier, the carriage may then be moved one column to the right and the multiplier key depressed to accomplish automatic multiplication to the intended digital value of the 10's order of of the multiplier, and so on until the example is completed. Thus with a single order of multiplier keys, the accumulation of the accumulator units is readily obtained. The multiplicand appears in the set-up keys on the board. The multiplier appears on the counter wheels seen through suitable sight openings 385, and the product appears upon the numeral wheels seen through the sight openings 76 of the carriage.

Zeroizing of the accumulator and resetting of the carriage into a desired starting position after a computation is accomplished by pulling forwardly a combined zeroizing and carriage resetting lever 458. In moving this lever forward, the carriage is lifted and the carrying springs released, as is disclosed more fully in Patent No. 1,926,826, so that with the carriage so lifted it may be moved to the desired starting point for the next calculation. The lever 458 is similar to the lever 185 disclosed in the above-mentioned patent.

Figure 2:
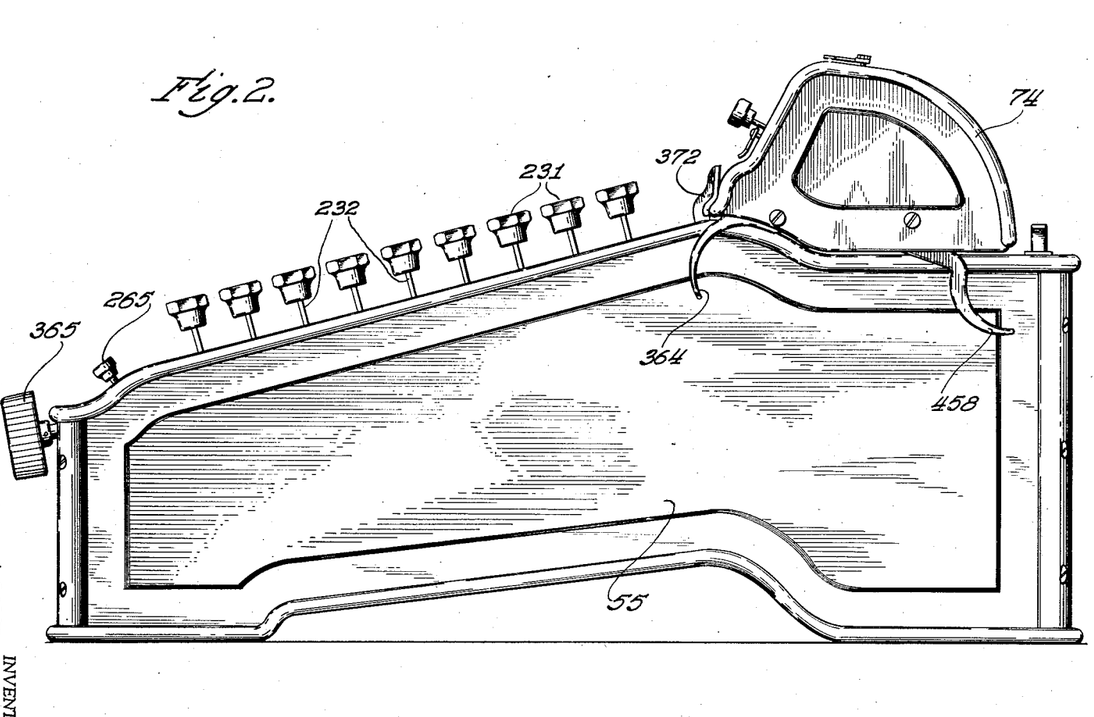
Fig. 2 is a side elevation thereof taken from the right.

Means are provided in the machine for permitting the correction of an error in setting up the keys of a multiplicand or a dividend. A button 265 (Figs. 1, 2 and 4) is arranged in front of each bank or column of keys of the adding actuating mechanism. The button 265 is provided with a stem 266 which extends through a housing 267 within the casing of the machine. The lower end of the stem 266 rests upon a lip or ledge 268 which is formed integrally with a rocker bellcrank 269 and is pivoted about the cross-rod 214. A stud 461 is fastened to the upper arm of the rocker bellcrank 269 and is adapted to engage an upwardly extending arm 462 which is formed integrally with the arm 207. It is of course understood that a rocker bellcrank 269 is provided for each additive order of the mechanism. Depression of the button 265 of a column in which a key 64 has been set causes the unlatching of the latch extension 205 from the lug 206 and permits the parts to return to normal unset position.

Means are also provided for preventing engagement of the latch 393 with a companion tooth 397 as the parts move back after such a release. It will be remembered that the latches 393 and 438 are rendered inactive only after a forward adding movement of the link 121 has occurred. Thus under key-set action, if it is desired to clear a key in any column prior to an adding actuation in that column, the latch 393 must be cleared or the return of the link 145 will set the key locks of the whole keyboard. The bar 145 has no forward movement prior to the resetting operation.

Referring to Figs. 1 and 11, it will be noted that a key 463 is provided between the board of additive actuating mechanism keys 64 and the column of multiplier keys 231. The key 463 has a stem 464 which rests upon a lip 465 formed integrally with a three-arm lever 467 and is pivoted at 468 in the frame. The forward arm 469 of the lever 467 engages a stud 471 which is fastened to an arm 472 and is keyed to the shaft 211. Downward depression of the key 463 rotates the forward arm 469 of the lever 467 which engages the stud 471 and rotating the shaft 211 in a counter-clockwise direction. This rotating movement of the shaft 211 will force the latches 207 downwardly and free all of the units of the adding actuating mechanisms.

The lever 467 has a third arm 473 extending downwardly and forwardly and is pivotally connected at 474 with a link 475. The link 475 extends backwardly and is connected by a pin and slot connection 476 with a downwardly extending arm 477. The arm 477 is mounted upon a rock shaft 478 which extends across the machine and rests in suitable bearing supports 479. At each adding order of the machine, an arm 481 is fastened on the shaft 478 having a pin or stud 482 fastened thereon. The pin 482 is placed beneath a tail 483 which is formed integrally with the associated latch 393 and is directly in the path of the stud 482 when the parts are arranged in key set position. Pressing of the button 463 swings the arms 481 upwardly to move the latches 393 to released position as an incident to the release of the latches 207.

A shaft 484 is placed near the front of the machine and is provided with an arm 485 (Fig. 4) and has a stud 486 fastened thereon which is adapted to be engaged and swung by the lower end 487 of the rocker bellcrank 269 when the rocker bellcrank is depressed by the button 265.

A subtraction mechanism which is controlled by a key 498 is provided and is similar to a like mechanism which is mentioned and fully described in Patent No. 1,926,826 above mentioned and does not require particular description here.

Means are provided for locking the multiplier keys 231 against depression when the machine is arranged for key-responsive operation. It is pointed out that a shaft 201 is rotated by means of a walking beam lever which converts the machine from a key-responsive to a key-set control and vice versa. The shaft 201 (Fig. 9) is provided at its right hand end with an arm 200 which has a lug 499 formed thereon. The lug 499 is adapted to engage beneath a shoulder lug 501 when the shaft 201 is arranged or rocked to the position shown in Fig. 9, which is the position it assumes when the machine is arranged for key-responsive action of its ordinal actuating mechanisms. When the parts are in this position, the arm 200 prevents depression of the bar 234 and all of the keys 231 are locked against actuation.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a calculating machine having actuating mechanism arranged in denominational orders, a plurality of orders of digital keys for controlling the operation of said actuating mechanism, an accumulator mechanism adapted to be actuated by said orders of actuating mechanism when in operative relationship therewith, and a carriage supporting said accumulator mechanism and adapted to be elevated to enable shifting thereof across said orders to vary the denominational relationship of said accumulator mechanism with said orders of actuating mechanism; means operable by the elevation of said carriage as said accumulator mechanism is moved out of operative relationship with said actuating mechanism, and means operable by said last means for locking said keys.

2. In a calculating machine having actuating mechanism arranged in denominational orders, keys for controlling the operation of said actuating mechanism, and a carriage containing an accumulator mechanism adapted to be actuated by said orders of actuating mechanism when in operative relationship therewith and to be elevated to render the same shiftable across said orders to vary the denominational relationship of said accumulator mechanism with said orders of actuating mechanism; means operable by the elevation of said carriage in the shifting thereof across said orders of actuating mechanism, and means operable by said last means for preventing operation of said keys when said accumulator mechanism is out of operative relationship with said orders of actuating mechanism.

3. In a calculating machine having digital control keys, and an accumulator carriage adapted to be elevated to enable shifting thereof transversely of the machine; control means operable by said carriage as it is elevated during such a shifting operation, and means operable by said control means for locking said keys against operation during shifting of the carriage.

4. In a calculating machine having an accumulator, actuating mechanism for said accumulator, keys for controlling the operation of said actuating mechanism, and a shiftable carriage housing said accumulator and adapted to be elevated to disengage the latter from said actuating mechanism to enable transverse shifting thereof relative to the actuating mechanism; that improvement which comprises control means operated by said carriage as it is elevated to disengage said accumulator from said actuting mechanism, and means operated by said control means for locking said keys against operation while said accumulator is disengaged from said actuating mechanism.

5. In a calculating machine having actuating mechanism arranged in denominational orders, means for operating said actuating mechanism, keys for controlling the operation of said operating means, a carriage containing accumulator mechanism actuated by said orders of actuating mechanism when in operative relationship therewith and adapted to be elevated to render the same shiftable across said orders to vary the denominational relationship of said accumulator mechanism with said orders of actuating mechanism, and manually operable means for elevating the carriage and returning said accumulator mechanism to zero position; that improvement which comprises an operating means actuated by the operation of said manually operable means, and means operable by said operating means for preventing operation of said keys during operation of said zeroizing means.

6. In a calculating machine having actuating mechanism arranged in denominational orders, accumulator mechanism adapted to be actuated by said actuating mechanism, and a carriage for housing said accumulator mechanism and adapted to be elevated to enable shifting thereof across said orders of said actuating mechanism to bring said accumulator mechanism into operative relation with different orders of actuating mechanism; that improvement which comprises an operating means actuated by said carriage as it is elevated in the shifting thereof across said orders of actuating mechanism, and means actuated by said operating means for preventing operation of said actuating mechanism when said accumulator mechanism is out of operative relationship therewith.

7. In a calculating machine having digital control keys, an accumulator carriage having a normal position in which it is incapable of being shifted and a position in which it may be shifted transversely of the machine, control means operable by said carriage as it is moved from said first position to said second position, and means operable by said control means for locking said keys against operation during movement of the carriage from the first to the second position.

8. In combination in a calculating machine, a plurality of denominational orders of actuating mechanism, a plurality of keys associated with each of said denominational orders of actuating mechanism for controlling the operation thereof, an accumulator operable by and movable relative to said actuating mechanism into and out of operative relationship therewith to vary the denominational relationship between the accumulator and said actuating mechanism, normally ineffective locking means for preventing operation of all of said keys, operating means for said locking means for rendering the same effective, and actuating means movable with said accumulator and adapted when moved therewith to actuate said operating means for rendering said locking means effective to prevent operation of said keys while said accumulator is out of operative relationship with said actuating mechanism.

9. In a calculating machine having a plurality of denominational orders of actuating mechanism, a plurality of keys associated with each said denominational order of actuating mechanism for controlling the operation thereof, and an accumulator operable by said actuating mechanism and movable relative thereto into and out of operative relationship therewith to vary the denominational relationship between the accumulator and said actuating mechanism; key movable means and other movable means, one of said movable means including a plurality of mechanisms corresponding in number to the number of orders of actuating mechanism and one said mechanism being associated with each said order of actuating mechanism, said key movable and other movable means constituting a normally ineffective key locking mechanism wherein said other movable means when operated will block the operation of said key movable means in said locking mechanism whereby to prevent operation of said keys, operating means for moving said other movable means to blocking position to render said key locking means effective, and means movable with said accumulator for actuating said operating means and preventing operation of all of said keys while said accumulator is out of operative relationship with said actuating mechanism.

JOSEPH A. V. TURCK.